United States Patent
Lawrence

(10) Patent No.: US 6,721,957 B1
(45) Date of Patent: Apr. 13, 2004

(54) SYSTEM AND METHOD FOR MAXIMIZING BANDWIDTH EFFICIENCY IN A DIGITAL VIDEO PROGRAM STREAM

(75) Inventor: Peter H. Lawrence, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 712 days.

(21) Appl. No.: 09/638,724

(22) Filed: Aug. 14, 2000

Related U.S. Application Data

(60) Provisional application No. 60/149,046, filed on Aug. 16, 1999.

(51) Int. Cl.[7] .............................. H04N 7/173; H04J 3/02
(52) U.S. Cl. ........................... 725/114; 725/91; 725/95; 725/96; 725/139; 370/538
(58) Field of Search ............................. 725/90, 91, 93, 725/95, 96, 97, 98, 114, 116, 117, 138, 144, 146, 147; 348/385.1, 387.1, 388.1; 370/538, 537

(56) References Cited

U.S. PATENT DOCUMENTS

| | | | |
|---|---|---|---|
| 4,649,536 A | | 3/1987 | Krinock ....................... 370/102 |
| 4,967,405 A | | 10/1990 | Upp et al. ...................... 370/1 |
| 5,583,562 A | * | 12/1996 | Birch et al. ................... 725/151 |
| 5,629,736 A | | 5/1997 | Haskell et al. ............... 348/387 |
| 5,710,598 A | * | 1/1998 | Ukai et al. ................. 375/240.2 |
| 5,956,426 A | * | 9/1999 | Matsuura et al. ............ 382/239 |
| 5,963,256 A | * | 10/1999 | Tahara ...................... 348/385.1 |
| 6,088,360 A | * | 7/2000 | Amaral et al. ............... 370/412 |
| 6,091,455 A | * | 7/2000 | Yang ....................... 375/240.01 |
| 6,154,501 A | * | 11/2000 | Friedman ..................... 375/260 |
| 6,233,255 B1 | * | 5/2001 | Kato et al. ................... 370/486 |
| 6,259,733 B1 | * | 7/2001 | Kaye et al. .................. 375/240 |
| 6,351,474 B1 | * | 2/2002 | Robinett et al. ............. 370/486 |
| 6,404,818 B1 | * | 6/2002 | Obikane ................. 375/240.28 |
| 6,414,970 B1 | * | 7/2002 | Negishi et al. ............. 370/510 |
| 6,498,798 B1 | * | 12/2002 | Krishnamoorthy et al. . 370/537 |
| 6,504,855 B1 | * | 1/2003 | Matsunaga ................... 370/537 |
| 6,535,523 B1 | * | 3/2003 | Karmi et al. ................ 370/468 |
| 6,675,387 B1 | * | 1/2004 | Boucher et al. ............. 725/105 |

* cited by examiner

Primary Examiner—John Miller
Assistant Examiner—Annan Q. Shang
(74) Attorney, Agent, or Firm—Thomas, Kayden, Horstemeyer & Risley, LLP

(57) ABSTRACT

A system and method for maximizing the efficiency of a video transport stream combines a number of lower rate transport streams into an aggregate higher rate transport stream while maintaining the accuracy of timing information in the aggregate transport stream. The system and method of the invention synchronize and compact each of the lower rate transport streams into the higher rate transport stream while preserving the accuracy of timing information in the aggregate transport stream.

20 Claims, 10 Drawing Sheets

US 6,721,957 B1

SYSTEM AND METHOD FOR MAXIMIZING BANDWIDTH EFFICIENCY IN A DIGITAL VIDEO PROGRAM STREAM

CROSS-REFERENCE TO RELATED APPLICATIONS

This document claims priority to and the benefit of the filing date of U.S. Provisional Patent Application entitled "HARDWARE ONLY SOLUTION TO MULTIPLEX SEVERAL MPEG-2 TRANSPORT STREAMS," assigned Ser. No. 60/149,046, and filed Aug. 16, 1999, the text of which is hereby incorporated by reference, and is related to commonly assigned co-pending U.S. Patent Application entitled "SYSTEM AND METHOD FOR MAINTAINING TIMING SYNCHRONIZATION IN A DIGITAL NETWORK," assigned Ser. No. 09/185,849, and filed on Nov. 4, 1998, the text of which is hereby incorporated by reference.

TECHNICAL FIELD

The present invention relates generally to the delivery of digital video using the well known MPEG-2 compression scheme, and more particularly, to a system and method for maximizing bandwidth efficiency by combining a number of digital video streams into one aggregate stream.

BACKGROUND OF THE INVENTION

The delivery of digital video signals to a subscriber has been accomplished via many ways. For example, compressed digital video using the motion picture experts' group (MPEG-2) compression/decompression methodology can be delivered using a variety of media including coaxial cable, fiber optic cable and satellite. Some of these delivery systems are considered "video-on-demand," or "near video-on-demand" in that a user, or subscriber, may select from a plurality of offerings and view a particular program as desired from time to time. In video-on-demand systems a user may select a program for viewing at any arbitrary time. In near video-on-demand systems, a user is typically given a choice of programming available at repeated specific times. Furthermore, broadcast video applies to programming that occurs with a daily or weekly schedule and is delivered to a wide number of subscribers at the same time.

The video programming can be delivered to a receiver via a number of methodologies, for example but not limited to, satellite, cable, fiber optic technology, etc. After receipt of the programming source content, these systems can use fiber optic cabling technology to deliver the video programming received by a digital receiver to the MPEG-2 digital video broadcast (DVB) equipment. DVB is a standard based on MPEG-2 that specifies the manner in which MPEG-2 data are transmitted via satellite, cable and terrestrial broadcast channels. The MPEG-2/DVB equipment then distributes the video programming via any of a number of methodologies to various locations for distribution to subscribers. Such a distribution system for video programming is described in the above-referenced commonly assigned, co-pending U.S. patent application Ser. No. 09/185,956, entitled SYSTEM AND METHOD FOR THE DELIVERY OF DIGITAL VIDEO AND DATA OVER A COMMUNICATIONS CHANNEL.

The MPEG-2/DVB equipment is capable of receiving the video information at the DVB-asynchronous serial interface (ASI) communication rate of approximately 213 megabits per second (Mbps). However, in the case of satellite delivery of the video content to a digital receiver, the satellite transponder is capable of delivering a data rate less than the 213 Mbps rate that the DVB-ASI equipment is capable of processing. For example, the satellite delivery system may be capable of delivering a data rate in the range of 18–60 Mbps, and typically delivers a data rate of approximately 40 Mbps. This leads to a number of digital receivers each receiving a transport stream at less than the 213 Mbps data rate from a number of satellite transponders. Each transport stream comprises a number of data packets. Because the DVB-ASI standard allows up to approximately a 213 Mbps data rate, and some MPEG-2/DVB equipment is capable of processing the 213 Mbps data stream, it would be desirable to have a way in which to aggregate the lower rate transport streams received from the satellite into a single higher rate transport stream for transfer to a single MPEG-2/DVB device.

Unfortunately, when multiplexing several disparate data packet sources into one higher speed aggregate channel, some data packets will likely be delayed longer than others while waiting to be sent. An MPEG-2 transport stream contains timing sensitive no information in the form of a program clock reference (PCR) value periodically stored in certain transport packets. Timing jitter caused by this multiplexing delay dilutes the accuracy of the PCR value.

Therefore, there is a need in the industry for a manner in which to maximize the bandwidth efficiency of the aforementioned DVB-ASI communication link, while preventing the loss of the timing information contained in the PCR value.

SUMMARY OF THE INVENTION

The present invention provides a system and method for maximizing bandwidth efficiency when transporting a number of video signals.

Briefly, in architecture, the system can be described as a system for combining a plurality of video streams into one aggregate video stream, comprising a synchronizer for synchronizing a plurality of video streams to a common clock, a compactor for compacting each valid packet contained in each of the plurality of video streams, a filter for filtering any packets in each of the plurality of video streams that contain null information, and a mixer for combining each of the plurality of compacted, filtered, video streams into an aggregate video stream, the aggregate video stream having a rate at least as great as the combined rate of each of the plurality of video streams.

The present invention can also be viewed as a method for combining a plurality of video streams into one aggregate video stream, the method comprising the steps of synchronizing a plurality of video streams to a common clock, compacting each valid packet contained in each of the plurality of video streams, filtering any packets in each of the plurality of video streams that contain null information, and combining each of the plurality of compacted, filtered, video streams into an aggregate video stream, the aggregate video stream having a rate at least as great as the combined rate of each of the plurality of video streams.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

The system and method for maximizing bandwidth efficiency when transporting a number of video program transport streams of the present invention can be implemented in hardware, software, firmware, or a combination thereof. In the preferred embodiment(s), the system and method for maximizing bandwidth efficiency when transporting a number of video program transport streams is implemented in hardware that is managed by software or firmware that is stored in a memory and that is executed by a suitable instruction execution system.

The software portion can be stored in a memory and be executed by a suitable instruction execution system (microprocessor). The hardware implementation of the system and method for maximizing bandwidth efficiency when transporting a number of video program transport streams can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, bandwidth efficiency maximization software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed. The program can be electronically captured, via for instance optical scanning of the paper or other medium, then compiled, interpreted or otherwise processed in a suitable manner if necessary, and then stored in a computer memory.

Figure 1:
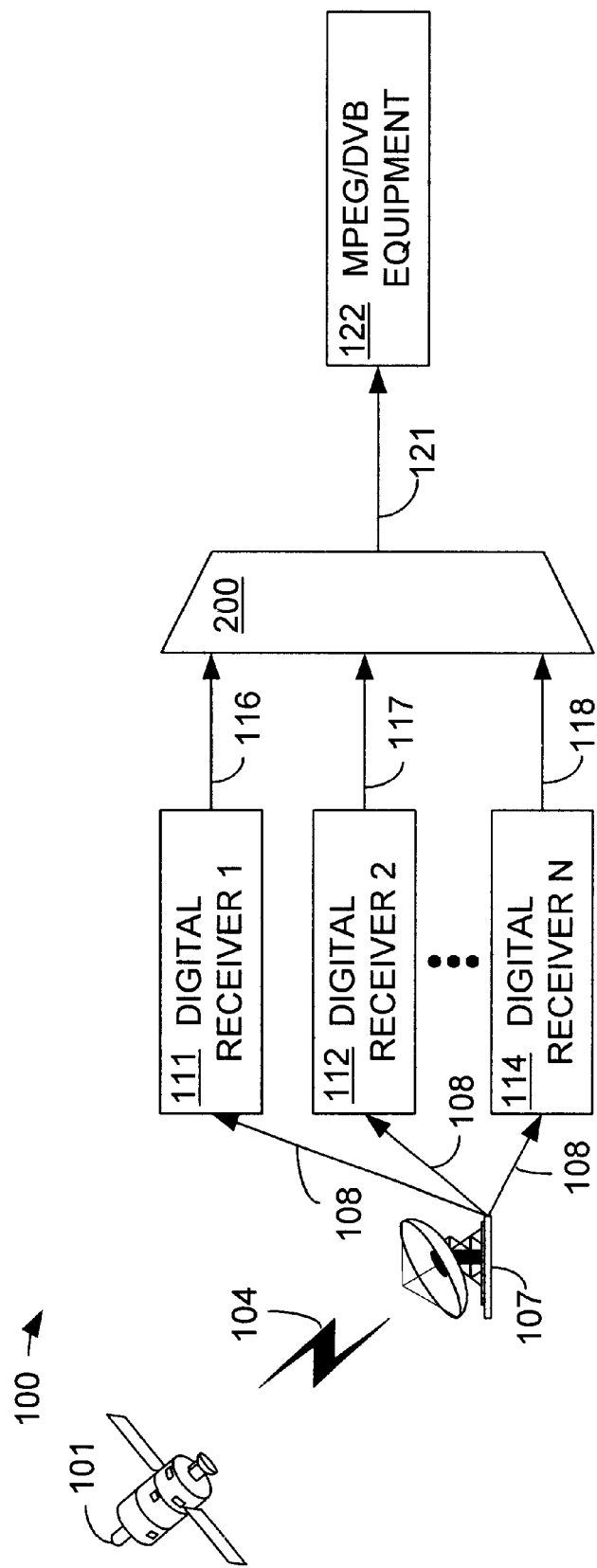
FIG. 1 is a schematic view illustrating a transmission environment in which the present invention resides.

Turning now to the drawings, FIG. 1 is a schematic view illustrating a transmission environment 100 in which the present invention resides. The example to follow with respect to FIG. 1 is for exemplar purposes only. Satellite 101 communicates video information via downlink 104 to digital television earth station 107. Digital television earth station 107 includes electronic processing circuitry necessary to convert the radio frequency signal containing the digital video content received via connection 104 to a signal that can be transported to digital television processing equipment. The digital video content received from the satellite 101 is relayed from digital television earth station 107 via communication channels collectively indicated using reference numeral 108 to a number of digital receivers, herein illustrated using digital receivers 111, 112 and 114. Although only three (3) digital receivers are illustrated, any number of digital receivers can be used. For illustration purposes only, digital receiver 111 communicates the digital video content received from digital television earth station 107 via communication channel 116 to mixer 200. Similarly, digital receiver 112 and digital receiver 114 communicate the digital video information received from digital television earth station 107 via communication channels 117 and 118, respectively, to mixer 200. The information carried via connections 116, 117 and 118 is typically transported at a rate of approximately 40 Mbps due to the limitations of the satellite transponder bandwidth.

In accordance with an aspect of the invention, mixer 200 combines the relatively low transmission rate signal on each of connections 116, 117 and 118 into a higher rate aggregate video transport stream and sends this aggregate video transport stream via connection 121 to MPEG/DVB equipment 122. The connection 121 is illustratively a DVB-ASI communication channel, capable of supporting a data rate of approximately 213 Mbps. In this manner, the mixer 200 combines the lower rate video transport streams carried on connections 116, 117 and 118 into a higher rate transport stream 121 without wasting any of the bandwidth available on the DVB-ASI communication link 121.

In order to offset the delay possible when combining the individual video transport streams on connections 116, 117 and 118 into an aggregate transport stream on connection 121, precautions should be taken to avoid any possibility of packet multiplexing jitter. Because an MPEG-2 transport stream contains time sensitive information in the form of PCR values periodically stored in certain transport packets, timing jitter caused by multiplexing delay can dilute the accuracy of the PCR values. In order to prevent loss of this timing information each PCR value is adjusted in order to compensate for any multiplexing delay. In accordance with an aspect of the invention, the video transport streams on connections 116, 117 and 118 can be multiplexed into a higher aggregate rate transport stream on connection 121 while preserving the timing information contained within each of the individual transport streams.

Figure 2:
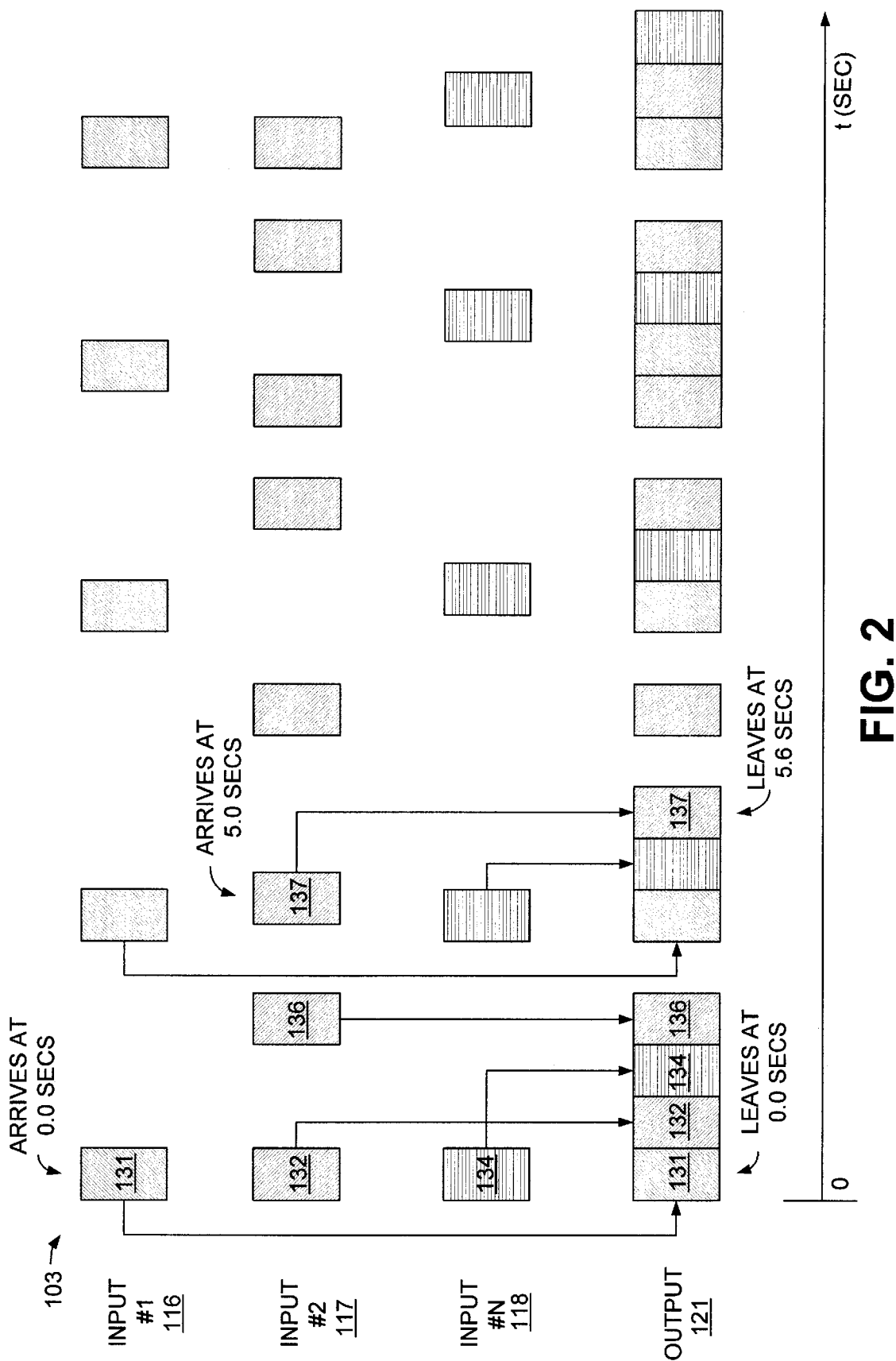
FIG. 2 is a graphical illustration representing the packet multiplexer jitter caused by multiplexing multiple slower rate transport streams into one aggregate higher rate transport stream.

FIG. 2 is a graphical illustration representing the packet multiplexer jitter caused by multiplexing multiple slower rate transport streams into one aggregate higher rate transport stream. Input #1, 116 corresponds to the output of digital receiver 111, input #2, 117 corresponds to the output of digital receiver 112, input #N, 118 corresponds to the output of digital receiver 114 and output 121 corresponds to the aggregate transport stream present on connection 121 of FIG. 1. In order to illustrate the concept of packet multiplexing jitter, consider packet 131 of input stream #1, 116. When packet 131 arrives, it is immediately placed into the output stream 121. However, when packet 132 of input #2, 117 arrives at the same time as packet 131, it will be placed behind packet 131 in the output stream 121. If a packet arrives alone and there are no other packets pending on other inputs, there will be no delay when multiplexing that packet to the output stream. However, if more than one packet arrives simultaneously (i.e., when packets from more than one input stream arrive simultaneously), then there will be some amount of delay in placing at least one of those packets in the output stream 121. For example, packet 137 may arrive at a certain time (e.g., at 5.0 sec) but will be placed in output stream 121 at some later time (e.g., 5.6 sec). In this manner, jitter delay is caused, thereby resulting in an undesirable corruption of timing information on connection 121.

When a packet, such as packet 137, is delayed, any timing information contained within that packet should be adjusted so that when the packet 137 is output at its delayed point in time the timing information is still accurate. A method for providing such timing information is disclosed in the above-referenced commonly assigned co-pending U.S. patent application Ser. No. 09/185,849, entitled SYSTEM AND METHOD FOR MAINTAINING TIMING SYNCHRONIZATION IN A DIGITAL NETWORK, filed on Nov. 4, 1998, which is hereby incorporated by reference.

Figure 3:
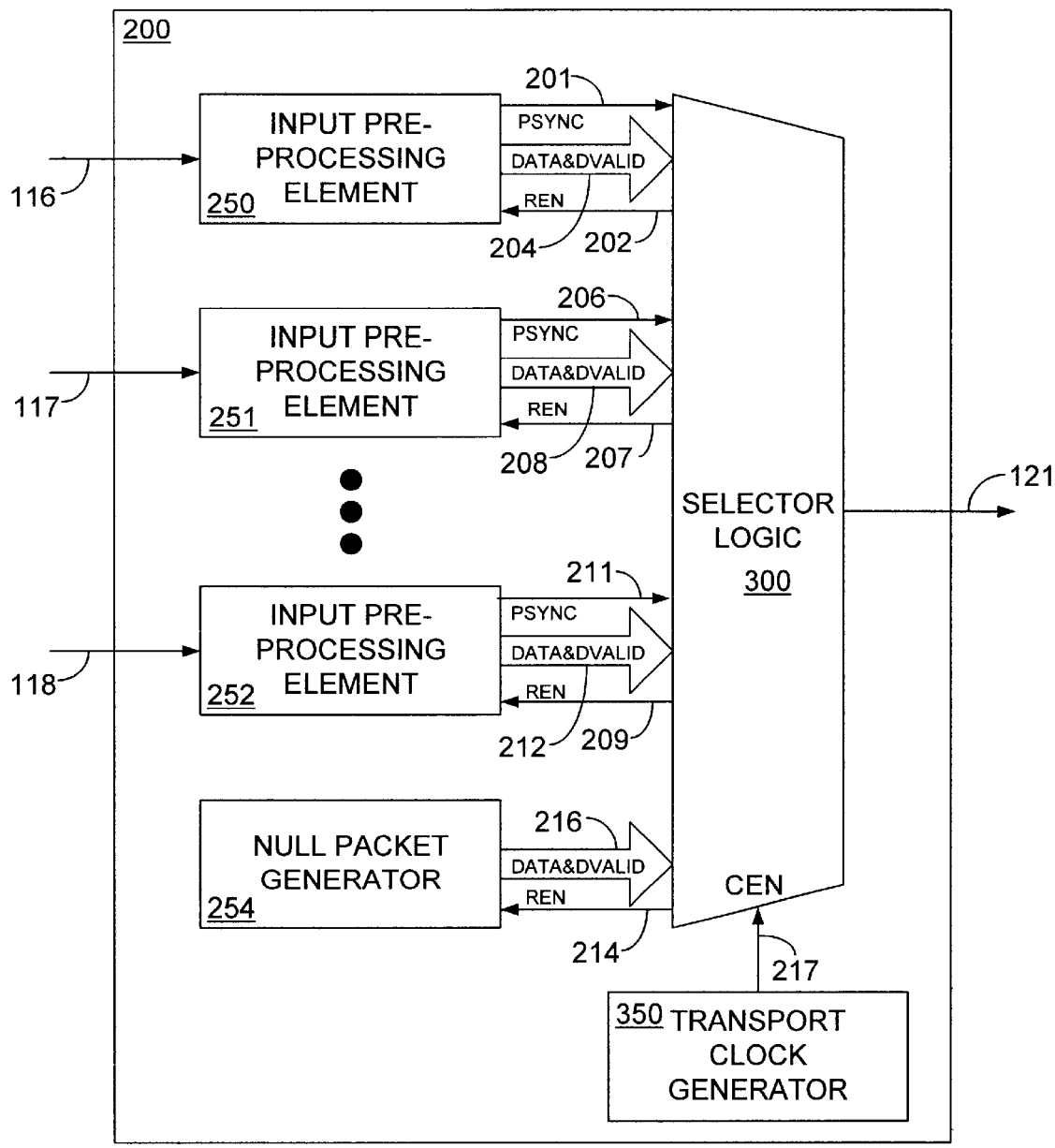
FIG. 3 is a schematic view illustrating, in further detail, the mixer of FIG. 1.

FIG. 3 is a schematic view illustrating, in further detail, the mixer 200 of FIG. 1. Mixer 200 includes a plurality of input pre-processing elements 250, 251 and 252. Although illustrated using only three input pre-processing elements, any number of input pre-processing elements can be included in mixer 200, corresponding to the number of input transport streams that are to be combined into a single high speed transport stream. Transport stream #1 is input via connection 116 to input pre-processing element 250. For simplicity, only the operation of input pre-processing element 250 will be discussed herein, however, the discussion similarly applies to all of the input pre-processing elements in FIG. 3. Input pre-processing element 250 supplies both data and a signal, known as the "DVALID" signal, represented by a bit, which determines whether or not data are present at a particular clock cycle. Input processing element 250 also supplies, via connection 201, a signal known as "PSYNC," which provides packet synchronization information, and receives a read enable signal (REN) from selector logic 300 via connection 202. Similarly, input pre-processing element 251 receives transport stream #2 via connection 117 and supplies the data and DVALID signal via connection 208, supplies the PSYNC signal via connection 206 and receives the read enable signal via connection 207. Similarly, input pre-processing element 252 receives transport stream #N via connection 118 and provides the data and DVALID signals via connection 212, the PSYNC signal via connection 211 and receives the read enable signal via connection 209.

Mixer 200 also includes null packet generator 254. Null packet generator 254 provides the data and DVALID signal via connection 216 and receives the read enable signal via connection 214. The operation of the null packet generator 254 will be discussed below.

The PSYNC signals are all supplied to selector logic 300. The data and DVALID signals are all supplied to a shared, common bus, whose combined results become the output 121. Selector logic 300 supplies the read enable signal via connections 202, 207, 209 and 214 to input pre-processing elements 250, 251, 252 and the null packet generator 254, respectively. In accordance with an aspect of the invention, selector logic 300 multiplexes the data supplied from each of the input pre-processing elements onto a single high bit rate DVB-ASI transport stream, which is output via connection 121. In accordance with an aspect of the invention, the output transport stream via connection 121 is at a rate at least as great as the aggregate of all the rates supplied via transport streams 116, 117 and 118. In this manner, it is assured that there will never be more than one packet in any input pre-processing element buffer at any given time.

Mixer 200 also includes a transport clock generator 350, which generates a clock enable signal (CEN), based on the 27MHz global clock. The clock enable signal CEN determines the data rate of output 121. The output data rate is chosen to be at least as great as the sum of all the inputs. Transport clock generator 350 supplies the clock enable signal CEN via connection 217 to selector logic 300. In accordance with an aspect of the invention, (as will be described below in further detail with respect to FIG. 6) selector logic 300 receives the PSYNC output of each of the input pre-processing elements 250, 251 and 252. Selector logic 300 then decides the order in which the data will be combined onto the output transport stream via connection 121.

Figure 4A:
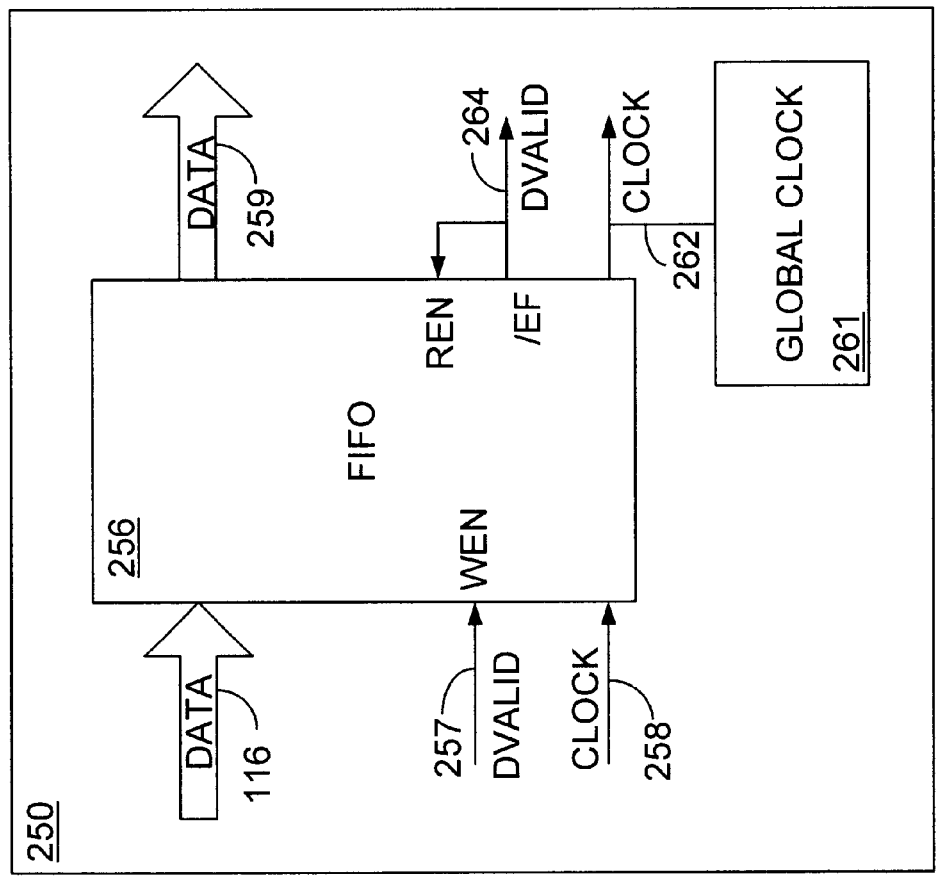
FIGS. 4A and 4B are block diagrams schematically illustrating an exemplar input pre-processing element of FIG. 3.
Figure 4B:
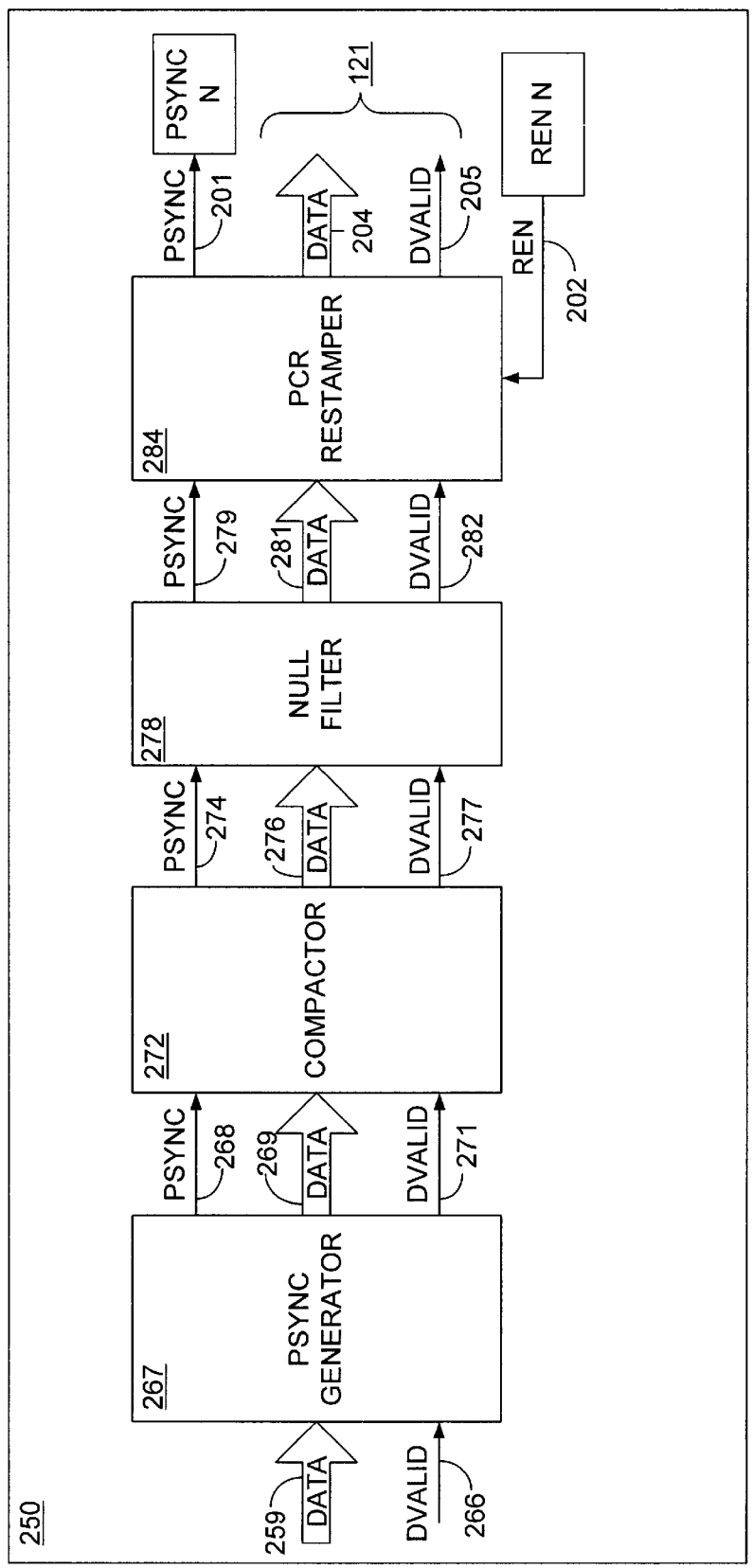

FIGS. 4A and 4B are block diagrams schematically illustrating an exemplar input pre-processing element 250 of FIG. 3. With reference to FIG. 4A, data are supplied via connection 116 to first-in-first-out (FIFO) buffer 256. The DVALID signal, which indicates whether the data contained in that particular clocked packet are valid, is supplied via connection 257 to the write enable (WEN) input of FIFO buffer 256. A clock signal is supplied via connection 258. Global clock element 261 provides, in this embodiment, a 27MHz clock signal via connection 262 to FIFO buffer 256. Although shown in FIG. 4A as providing a global clock signal to FIFO buffer 256, the global clock element 261 supplies the global clock signal to all input pre-processing elements 250, 251 and 252.

The DVALID signal is supplied from FIFO buffer 256 via connection 264 to the read enable (REN) input of FIFO buffer 256. The input transport stream supplied via connection 116 is clocked into the FIFO buffer 256 at some clock rate up to the global clock rate. The DVALID signal 257 is illustrated to cover the situation in which new data from the input are not available on every input clock cycle. On input clock cycles where the DVALID signal 257 is not asserted, the write enable (WEN) input of FIFO buffer 256 will not be asserted, and the input data will be not be written into the FIFO buffer 256.

The output of FIFO buffer 256 on connection 259 is a transport stream that is clocked out at the global clock rate (i.e., 27MHz in this illustration). Because the input is being clocked into the FIFO buffer 256 at a rate less than the global clock rate supplied via global clock element 261, the FIFO buffer 256 is often empty. The signal DVALID is directly derived from the empty FIFO flag (port /EF (not EF)) that is generated by the FIFO buffer 256. On clock cycles where there are no data in the FIFO buffer 256, the DVALID signal on connection 264 is not asserted. On clock cycles where there are data in the FIFO buffer 256, the DVALID signal on connection 264 is asserted and that data value is driven on the output lines 259 coming out of the FIFO buffer 256. The DVALID signal on connection 264 is asserted only on the words that contain usable data. Using this representation, any transport stream from 0 Mbps up to the global clock rate and word size can be communicated. By converting all inputs to a representation that uses only one global clock rate, the design of the input processing element 250 can be simplified because all elements of the hardware design operate at the same clock rate using the same clock signal. In this particular embodiment, the global clock rate is 27 MHz, as this is the same clock rate used for representing timing information in the MPEG-2 standard. Furthermore, this clock rate is chosen because the PCR restamping element (to be described with respect to FIG. 4B) preferably uses it as well.

Referring now to FIG. 4B, the output of the FIFO buffer 256 via connection 259 is supplied to the packet synchronization (PSYNC) generator 267. The DVALID signal is also provided to the PSYNC generator 267 via connection 266. The PSYNC generator 267 sets the PSYNC flag for the first byte of every transport packet and supplies this signal via connection 268. This enables the subsequent modules to easily identify the beginning of each transport stream packet. The data are supplied from the PSYNC generator 267 via connection 269 to compactor 272. Essentially, the PSYNC generator 267 synchronizes to the input transport stream present on connection 259 and asserts the PSYNC signal on the first byte of each transport packet. The compactor 272 receives the transport stream via connection 269 and organizes the packets so that all bytes associated with a particular transport packet occur on contiguous clock cycles. The packet data are grouped together (i.e., compacted) so that the bytes associated with a particular transport packet are transmitted on contiguous global clock cycles. This is done so as to ensure that each transport packet arrives at a data rate that is never less than the output transport rate, thus allowing the packet to be routed to the output as soon as it begins arriving without allowing the FIFO buffer 256 to underflow. In addition, the DVALID signal is supplied via connection 271 to compactor 272.

The data output of compactor 272 is supplied via connection 276 to null filter 278. Null filter 278 also receives the PSYNC signal via connection 274 and the DVALID signal via connection 277. The null filter 278 removes any null packets from the transport stream, thereby further maximizing bandwidth efficiency of the DVB-ASI communication link on connection 121 (FIG. 1). The null filter 278 supplies a filtered signal via connection 281 to PCR restamper 284. It should be noted that the positions of the compactor 272 and null filter 278 may be reversed.

PCR restamper 284 also receives the PSYNC signal via connection 279 and the DVALID signal via connection 282. The data on connection 281 represents only the packets that are to be eventually routed to the output 121 of FIG. 3 and are operated on by PCR restamper 284 in accordance with that disclosed in the above-referenced U.S. patent application Ser. No. 09/185,849, entitled SYSTEM AND METHOD FOR MAINTAINING TIMING SYNCHRONIZATION IN A DIGITAL NETWORK.

The PCR restamper 284 supplies the filtered transport stream data via connection 204 and the associated DVALID signal 205 to the common bus that forms the output 121. Furthermore, the PCR restamper 284 supplies the PSYNC signal via connection 201. The PCR restamper 284 also receives the read enable signal (REN) from selector logic 300 via connection 202.

Figure 5:
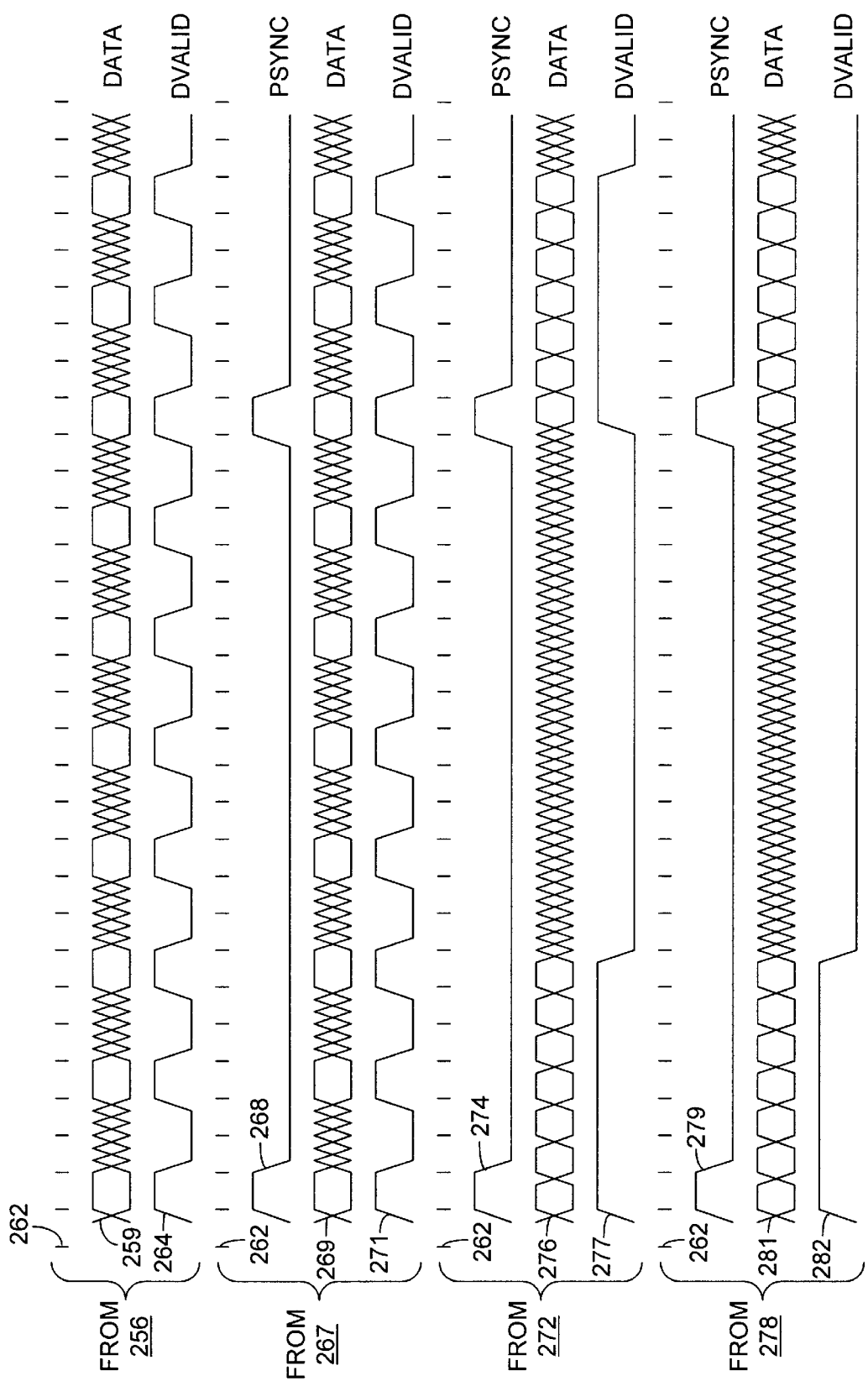
FIG. 5 is a graphical representation of the logical waveforms produced by the elements within the input pre-processing element of FIGS. 4A and 4B.

FIG. 5 is a graphical representation of the logical waveforms produced by the elements comprising input pre-processing element 250 of FIGS. 4A and 4B. The waveforms that represent the output supplied by FIFO buffer 256 of FIG. 4A include the 27MHz global clock signal represented by reference numeral 262, the data on connection 256 and the DVALID signal on connection 264. As illustrated, for each instance of the DVALID signal on connection 264 becoming active, the data represented via waveform 259 are considered valid.

The waveforms that represent the output of the PSYNC generator 267 of FIG. 4B illustrate that the PSYNC signal represented by waveform 268 is asserted for the first byte of each transport packet, represented by waveform 269. Each instance of the DVALID signal being asserted, represented by waveform 271, indicates valid data present on connection 269.

The waveforms that represent the output of compactor 272 are illustrated whereby the DVALID signal on connection 277 is a logic high for the duration of all of the compacted valid data packets represented by waveform 276. Similarly, as described above, the PSYNC signal represented by waveform 274 is active for the first byte of each valid transport packet.

The waveforms that represent the output of null filter 278 include the DVALID waveform 282, which indicates that any null packets are filtered out.

Figure 6:
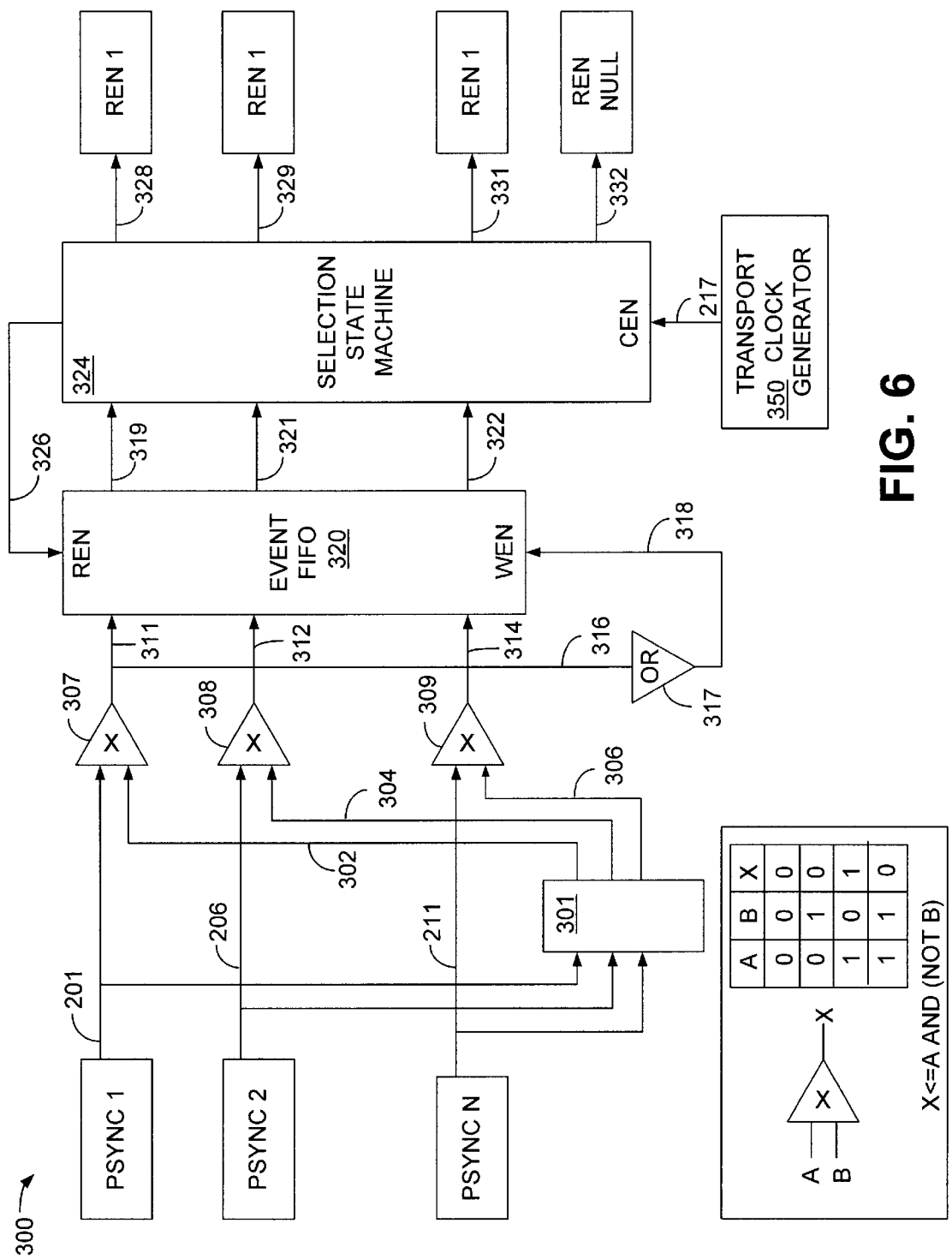
FIG. 6 is a block diagram illustrating the selector logic of FIG. 3.

FIG. 6 is a block diagram illustrating the selector logic 300 of FIG. 3. The selector logic 300 shown in FIG. 6 illustrates one manner of implementing the first come, first served operation of selector logic 300 of FIG. 3. A PSYNC signal from each input pre-processing element (250, 251, 252 of FIG. 3) is supplied to a latch 301 and to a respective logic gate 307, 308 and 309. For example, the PSYNC signal on connection 201 is supplied simultaneously to latch 301 and to logic gate 307. Latch 301 delays the signal on connection 201 by one clock cycle and supplies the delayed PSYNC signal via connection 302 to logic gate 307.

The event of the beginning of a new packet arriving via one of the pre-processing element outputs is indicated by the assertion of the PSYNC signal. The logic of logic gates 307, 308 and 309 is as shown in FIG. 6 whereby the output of the gate will be logic high only if input A is asserted and input B is deasserted. When the output of gate 307 goes to logic high this signal is communicated via connection 311 to event FIFO buffer 320. The event FIFO buffer 320 writes a new word (N bits wide, where N is the number of transport stream inputs) into the event FIFO buffer 320 whenever one or more of the PSYNC signals are asserted for the first time on a given global clock cycle. For every clock cycle, OR gate 317 performs a logical OR operation on all of the outputs 311, 312 and 314 of logic gates 307, 308 and 309, respectively. Whenever a logic high is present at the output of any of the logic gates 307, 308 or 309, OR gate 317 provides a logic high signal via connection 318 to the write enable (WEN) input of event FIFO buffer 320. At this time, the event FIFO buffer 320 writes the new word supplied via connections 311, 312 and 314.

The selection state machine 324 receives the output of event FIFO buffer 320 via connections 319, 321 and 322. These three (3) outputs correspond to the inputs 311, 312 and 314, respectively. The selection state machine 324 services the event FIFO buffer 320 in order to determine the order in which currently buffered transport packets should be introduced to the output. In the absence of any transport packets to forward, the selection state machine can have no transport packets sent instead. Data are drawn out of the event FIFO buffer 320 and the null packet generator (254 of FIG. 3) using the transport clock generator 350 (to be described in further detail with respect to FIG. 8). The selection state machine 324 provides the read enable signal (REN) to event FIFO buffer 320 via connection 326. When ready to output the data word, selection state machine logic 324 outputs the first transport stream via connection 328, the second transport stream via connection 329, the third transport stream via connection 321, and the null packet transport stream via connection 332.

Essentially, when an event occurs on any of the PSYNC signal lines 201, 206 and 211, and one of the logic gates 307, 308 or 309 output a logic high, the OR gate 317 asserts the write enable signal (WEN) via connection 318 causing a word to be written into the event FIFO buffer 320. When commanded by the transport clock generator 350 with the clock enable signal via connection 217, the selection state machine 324 reads a word out of the event FIFO buffer 320, the word corresponding to the state of each of the inputs 311, 312 and 314. Whenever there is a bit set to logic high in that word in a position N that corresponds to the input transport stream, the selection state machine determines which input to provide next.

Figure 7:
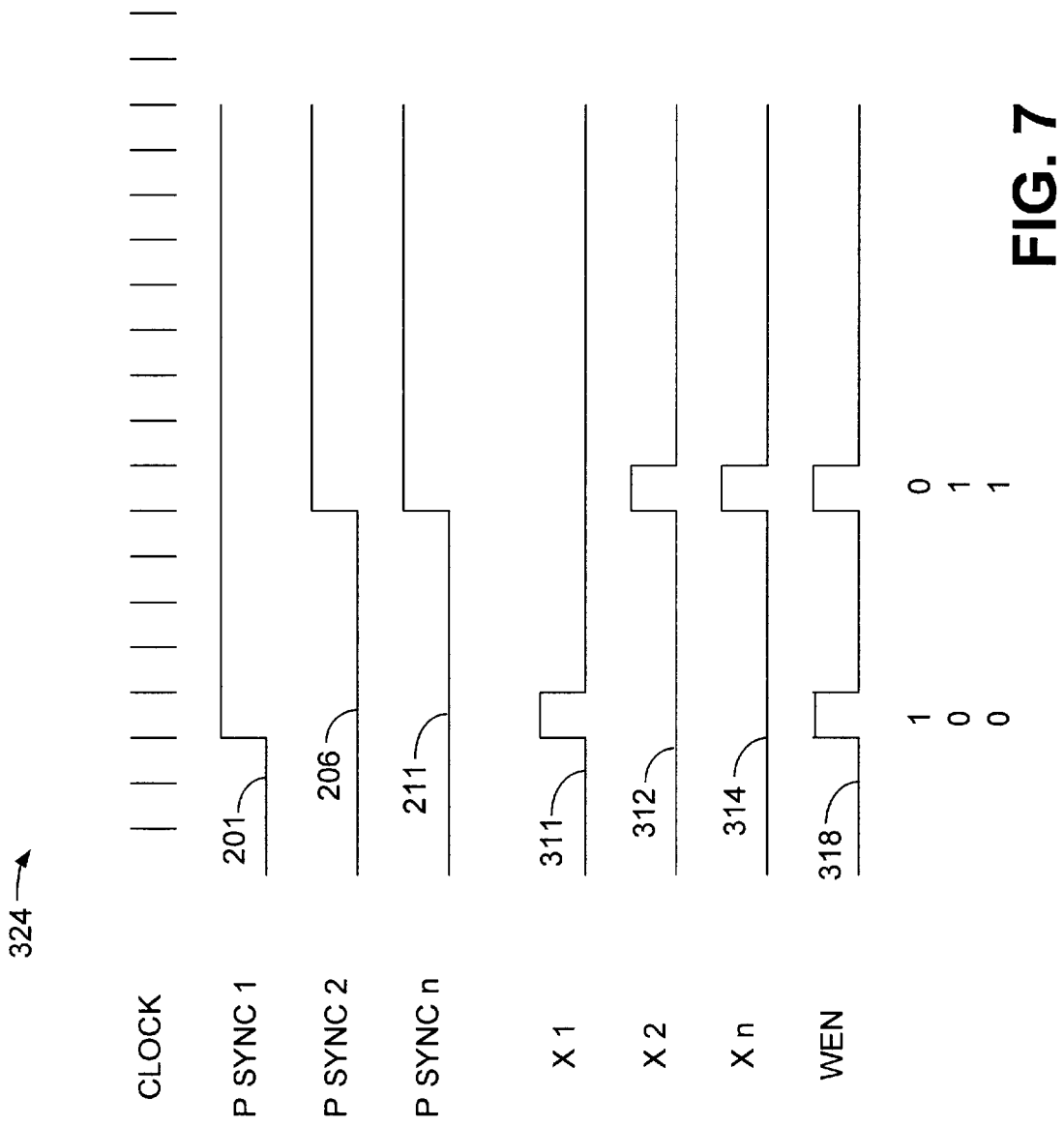
FIG. 7 is a graphical representation illustrating the operation of the selector logic of FIG. 6.

FIG. 7 is a graphical representation illustrating the operation of the selector logic 300 of FIG. 6. As shown in FIG. 7, when the PSYNC signal on connection 201 transitions from logic low to logic high, the output of logic gate 307, represented via waveform 311, also goes to a logic high. At the same time, the PSYNC signal on connection 206 and the PSYNC signal on connection 211 are both at a logic low, thereby forcing the output of logic gate 308 on connection 312 and the output of logic gate 309 on connection 314 to be logic low. Because the output of at least one of the outputs of logic gates 307, 308 and 309 is at a logic high (i.e., the output of logic gate 307), the OR gate 317 asserts the write enable signal (WEN) on connection 318. At this point the asserted output 318 of logic gate 317 causes the data word represented by bits corresponding to the output of logic gates 307, 308 and 309 on connections 311, 312 and 314, respectively, to be written into the event FIFO buffer 320.

Similarly, when the PSYNC signal on connection 206 and the PSYNC on connection 211 transitions from low to high, the output of logic gate 308 on connection 312 and the output of logic gate 309 on connection 14 are both high. The write enable signal is asserted by the OR gate 317 and the data word corresponding to the logic 011 (311 low, 312 high and 314 high) is written into the event FIFO buffer 320.

Figure 8:
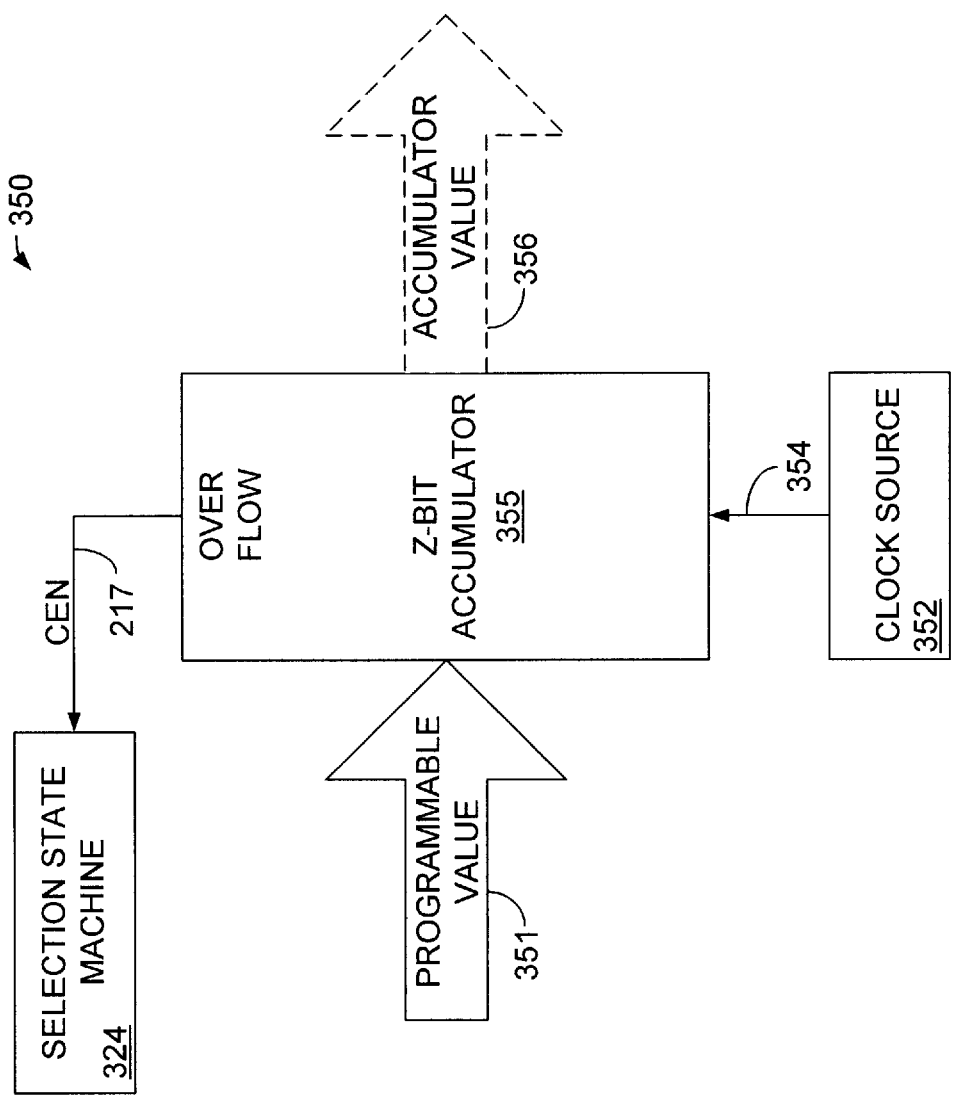
FIG. 8 is a block diagram illustrating, in further detail, the output transport clock generator of FIG. 6.

FIG. 8 is a block diagram illustrating, in further detail, the output transport clock generator 350 of FIG. 6. The output transport clock generator 350 includes a Z-bit accumulator 355 to which a programmable value is communicated via connection 351. This programmable value can be, for example but not limited to, as follows:

programmable_value=1/(clock_source/desired_transport_rate)*2^Z actual_transport_rate= (programmable_value/2^Z)* clock_source. This value is set to determine the rate of the output transport stream. By making Z larger, greater fine tuning in setting the transport rate is possible.

Clock source 352 supplies a 27MHz clock signal via connection 354. In this embodiment, clock source 352 is the same 27MHz global clock utilized by all the input pre-processing elements as shown in FIGS. 4A and 4B. The accumulator 355 supplies the clock enable signal (CEN) from its overflow port to the selection state machine 324 of FIG. 6 via connection 217. The accumulator value is supplied via connection 356; however, the value is meaningless in that only the overflow flag is supplied to the selection state machine 324.

Figure 9:
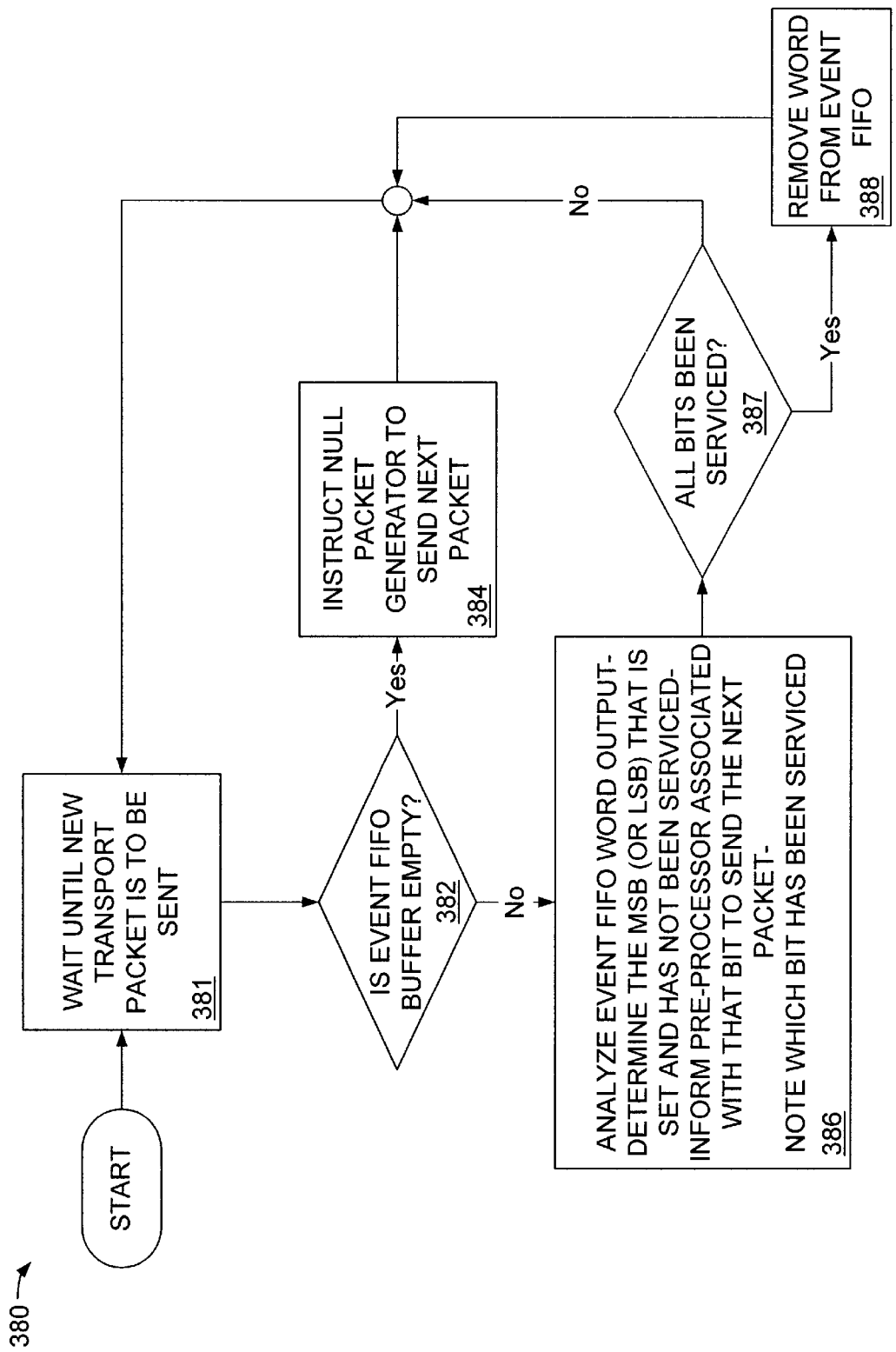
FIG. 9 is a flow diagram illustrating the operation of the selection state machine of FIG. 6.

FIG. 9 is a flow diagram 380 illustrating the operation of the selector state machine 324 of FIG. 6. The flow diagram of FIG. 9 shows the architecture, functionality, and operation of a possible implementation of the selector state machine 324 of FIG. 6. In this regard, each block represents a module, segment, or portion of code, which comprises one or more executable instructions for implementing the specified logical function(s). It should also be noted that in some alternative implementations, the functions noted in the blocks may occur out of the order noted in FIG. 9. For example, two blocks shown in succession in FIG. 9 may in fact be executed substantially concurrently or the blocks may sometimes be executed in the reverse order, depending upon the functionality involved, as will be further clarified below.

In block 381, the selection state machine 324 waits for a new transport packet to be sent. In block 382, the selection state machine 324 determines whether the event FIFO buffer 320 is empty. If the event FIFO buffer 320 is empty, then in block 384 the selection state machine 324 orders the null packet generator 254 to send the next packet.

If it is determined in block 382 that the event FIFO buffer 320 is not empty, then, in block 386, the selection state machine 324 analyzes the event FIFO buffer 320 output word (via connections 319, 321 and 322), to determine the most significant bit or least significant bit that is set and that has not yet been serviced. The selection state machine 324 will then communicate to the appropriate input pre-processing element (FIG. 3) associated with that bit to send the next packet. The selection state machine 324 will also note which bit has been serviced.

In block 387, it is determined whether all bits have been serviced. If all bits have been serviced, then, in block 388, the word is removed from the event FIFO buffer 320. If all the bits have not been serviced, then the process returns to block 381.

Many variations and modifications may be made to the above-described embodiment(s) of the invention without departing substantially from the scope and principles of the invention. For example, more or fewer input transport streams may be combined using the principles of the invention depending upon the application. All such modifications and variations are intended to be included herein within the scope of the present invention.

Therefore, having thus described the invention, at least the following is claimed:

1. A system for combining a plurality of video streams into one aggregate video stream, comprising:
   a synchronizer for synchronizing a plurality of video streams to a common clock;
   a compactor for compacting each valid packet contained in each of the plurality of video streams;
   a filter for filtering any packets in each of the plurality of video streams that contain null information; and
   a mixer for combining each of the plurality of compacted, filtered video streams into an aggregate video stream, the aggregate video stream having a rate at least as great as the combined rate of each of the plurality of video streams.

2. The system as defined in claim 1, wherein each of the plurality of video streams is a digital video broadcast-asynchronous serial interface (DVB-ASI) video stream.

3. The system as defined in claim 1, wherein the synchronizer synchronizes the plurality of video streams to a 27MHz clock.

4. The system as defined in claim 1, wherein the compactor packs each of the valid packets so that they occur on contiguous cycles of the common clock.

5. The system as defined in claim 1, wherein the mixer determines the order in which each of the plurality of video streams is combined into the aggregate video stream.

6. A method for combining a plurality of video streams into one aggregate video stream, the method comprising the steps of:

synchronizing a plurality of video streams to a common clock;

compacting each valid packet contained in each of the plurality of video streams;

filtering any packets in each of the plurality of video streams that contain null information; and combining each of the plurality of compacted, filtered video streams into an aggregate video stream, the aggregate video stream having a rate at least as great as the combined rate of each of the plurality of video streams.

7. The method as defined in claim 6, wherein each of the plurality of video streams is a digital video broadcast-asynchronous serial interface (DVB-ASI) video stream.

8. The method as defined in claim 6, wherein the synchronizing step synchronizes the plurality of video streams to a 27MHz clock.

9. The method as defined in claim 6, wherein the compacting step packs each of the valid packets so that they occur on contiguous cycles of the common clock.

10. The method as defined in claim 6, wherein the combining step further includes the step of determining the order in which each of the plurality of video streams is combined into the aggregate video stream.

11. A system for combining a plurality of video streams into one aggregate video stream, comprising:

means for synchronizing a plurality of video streams to a common clock;

means for compacting each valid packet contained in each of the plurality of video streams;

means for filtering any packets in each of the plurality of video streams that contain null information; and means for combining each of the plurality of compacted, filtered video streams into an aggregate video stream, the aggregate video stream having a rate at least as great as the combined rate of each of the plurality of video streams.

12. The system as defined in claim 11, wherein each of the plurality of video streams is a digital video broadcast-asynchronous serial interface (DVB-ASI) video stream.

13. The system as defined in claim 11, wherein the means for synchronizing synchronizes the plurality of video streams to a 27MHz clock.

14. The system as defined in claim 11, wherein the means for compacting packs each of the valid packets so that they occur on contiguous cycles of the common clock.

15. The system as defined in claim 11, wherein the means for combining determines the order in which each of the plurality of video streams is combined into the aggregate video stream.

16. A computer readable medium having a program for combining a plurality of video streams into one aggregate video stream, the program comprising logic for performing the steps of:

synchronizing a plurality of video streams to a common clock;

compacting each valid packet contained in each of the plurality of video streams;

filtering any packets in each of the plurality of video streams that contain null information; and combining each of the plurality of compacted, filtered video streams into an aggregate video stream, the aggregate video stream having a rate at least as great as the combined rate of each of the plurality of video streams.

17. The program as defined in claim 16, wherein each of the plurality of video streams is a digital video broadcast-asynchronous serial interface (DVB-ASI) video stream.

18. The program as defined in claim 16, wherein the synchronizing step synchronizes the plurality of video streams to a 27 MHz clock.

19. The program as defined in claim 16, wherein the compacting step packs each of the valid packets so that they occur on contiguous cycles of the common clock.

20. The program as defined in claim 16, wherein the combining step further includes the step of determining the order in which each of the plurality of video streams is combined into the aggregate video stream.

* * * * *